(12) United States Patent
Son et al.

(10) Patent No.: US 11,578,773 B1
(45) Date of Patent: Feb. 14, 2023

(54) ELECTRO-MECHANICAL BRAKE AND VEHICLE COMPRISING THE SAME

(71) Applicant: HL MANDO Corporation, Pyeongtaek-si (KR)

(72) Inventors: Pyeong Kook Son, Seongnam-si (KR); Woochul Lim, Yongin-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 0 days.

(21) Appl. No.: 17/885,276

(22) Filed: Aug. 10, 2022

(30) Foreign Application Priority Data

Aug. 11, 2021 (KR) .................... 10-2021-0106114

(51) Int. Cl.
| | | |
|---|---|---|
| B60T 13/74 | (2006.01) | |
| F16D 65/22 | (2006.01) | |
| F16D 51/20 | (2006.01) | |
| F16D 125/48 | (2012.01) | |
| F16D 125/40 | (2012.01) | |
| F16D 125/52 | (2012.01) | |
| F16D 121/24 | (2012.01) | |

(52) U.S. Cl.
CPC ............ *F16D 65/22* (2013.01); *F16D 51/20* (2013.01); *F16D 2121/24* (2013.01); *F16D 2125/40* (2013.01); *F16D 2125/48* (2013.01); *F16D 2125/52* (2013.01)

(58) Field of Classification Search
CPC ...... F16D 51/20; F16D 65/22; F16D 2121/24; F16D 2125/40; F16D 2125/48; F16D 2125/52; B60T 13/741
See application file for complete search history.

(56) References Cited

U.S. PATENT DOCUMENTS

| | | | |
|---|---|---|---|
| 2010/0206677 A1 | 8/2010 | Shiraki | |
| 2021/0394734 A1* | 12/2021 | Ko | ............. F16D 51/22 |
| 2022/0063579 A1* | 3/2022 | Molinaro | ............. F16D 65/22 |

FOREIGN PATENT DOCUMENTS

| | | | | |
|---|---|---|---|---|
| FR | 3016013 A1 * | 7/2015 | | ............ B60T 13/02 |
| FR | 3079271 A1 * | 9/2019 | | ............ F16D 51/22 |
| JP | 2008-275053 A | 11/2008 | | |
| JP | 2017-502228 A | 1/2017 | | |

(Continued)

OTHER PUBLICATIONS

Abstract for FR-3016013 (no date).*

(Continued)

*Primary Examiner* — Nicholas J Lane
(74) *Attorney, Agent, or Firm* — Morgan, Lewis & Bockius LLP

(57) ABSTRACT

An electro-mechanical brake and a vehicle including the same are provided. As an electro-mechanical brake according to one embodiment of the present invention, an electro-mechanical brake including a drum, a first brake shoe, and a second brake shoe, may include a motor that provides a rotational driving force; a rotating member that rotates about a second rotating shaft perpendicular to a first rotating shaft of the motor; a power transmission member that transmits the rotational driving force of the motor to the rotating member; and a rotating screw that is coupled to the rotating member so that the first brake shoe is able to move forward and backward toward one inner peripheral surface of the drum.

18 Claims, 9 Drawing Sheets

(56) References Cited

FOREIGN PATENT DOCUMENTS

| | | | |
|---|---|---|---|
| JP | 6254697 | B2 | 12/2017 |
| KR | 10-2019-0043713 | A | 4/2019 |
| KR | 10-2019-0128346 | A | 11/2019 |
| KR | 10-2021-0032100 | A | 3/2021 |
| KR | 10-2021-0063199 | A | 6/2021 |
| WO | 2004/059189 | A1 | 7/2004 |

OTHER PUBLICATIONS

Abstract for FR-3079271 (no date).*
Office Action issued in corresponding Korean Patent Application No. 10-2021-0106114, dated May 12, 2022 with English Translation.

* cited by examiner

ELECTRO-MECHANICAL BRAKE AND VEHICLE COMPRISING THE SAME

CROSS REFERENCE TO RELATED APPLICATION

The present application claims priority to Korean Patent Application No. 10-2021-0106114, filed Aug. 11, 2021, the entire contents of which is incorporated herein for all purposes by this reference.

BACKGROUND OF THE INVENTION

Field of the Invention

The present invention relates to an electro-mechanical brake and a vehicle including the same, and more particularly, to an electro-mechanical brake that provides a pressurizing force using a rotational driving force of a motor, and a vehicle including the same.

Description of the Related Art

In general, a brake device is a device for stopping a vehicle from moving during braking or parking, and serves to hold the wheels of the vehicle from rotating.

Recently, an electro-mechanical brake (EMB) system for electronically controlling the driving of a brake has been developed. Such an electro-mechanical brake can be operated not only through a driver's manual operation, but also can be operated automatically in the case of a vehicle to which an autonomous driving system is applied, so it is very convenient and can realize the luxury of the vehicle.

Accordingly, there is an increasing demand to make the structure of the electro-mechanical brake more efficient and miniaturized. In particular, there is an increasing demand for electronically controlling a drum brake, which has advantages in weight, price, and the like, compared to a caliper brake that generates a braking force by pressing a rotating disk with brake pads.

Meanwhile, conventionally, a driving force is provided only to a parking brake for parking using an electronically controllable motor, and a driving force is provided to a service brake for driving control through a generally used hydraulic pressure. As such, when the parking brake and the service brake are separately provided, there are problems in that not only the overall weight of the vehicle increases, but also the space occupied by the interior of the vehicle increases.

Accordingly, the demand for an electro-mechanical brake capable of efficiently utilizing the space inside the vehicle by removing the hydraulic line by enabling electronic control while performing the parking brake and driving brake functions as a single device is increasing.

DOCUMENTS OF RELATED ART (Patent Document 1) KR 10-2019-0128346 A1 (drum integrated parking brake)

SUMMARY OF THE INVENTION

In order to solve the above problems, an object of the present invention is to provide an electro-mechanical brake capable of miniaturizing and simplifying a power transmission structure.

An object of the present invention is to provide an electro-mechanical brake capable of reducing damage to a power transmission structure.

An object of the present invention is to provide an electro-mechanical brake that is relatively less damaged in a brake environment in which dust and foreign substances are easily generated.

An object of the present invention is to provide an electro-mechanical brake with less backlash of a rotating screw.

An object of the present invention is to provide an electro-mechanical brake capable of maintaining the braking force of a brake in a parking situation.

An object of the present invention is to provide an electro-mechanical brake capable of performing parking braking and service braking in one device.

The objects of the present invention are not limited to the objects mentioned above, and other objects not mentioned will be clearly understood by those skilled in the art from the description below.

In order to achieve the objects, as an electro-mechanical brake according to one aspect of the present invention, an electro-mechanical brake including a drum, a first brake shoe, and a second brake shoe, may include a motor that provides a rotational driving force; a rotating member that rotates about a second rotating shaft perpendicular to a first rotating shaft of the motor; a power transmission member that transmits the rotational driving force of the motor to the rotating member; a rotating screw that is coupled to the rotating member so that the first brake shoe is able to move forward and backward toward one inner peripheral surface of the drum, wherein the power transmission member includes: a first gear that is coupled to the first rotating shaft of the motor; a second gear that is formed on an outer peripheral surface of the rotating member; a third gear that is disposed on a third rotating shaft parallel to the first rotating shaft and engaged with the first gear; a transmission shaft that transmits a rotational force of the third gear to the second gear; and a guide portion that is between the second gear and the rotating member to guide the second gear to relatively translate with the rotating member along an axial direction in which the second rotating shaft extends while limiting the second gear to rotate about the second rotating shaft together with the rotating member.

Here, the electro-mechanical brake may further include an elastic member including one end connected to the first brake shoe and the other end connected to the second brake shoe to pull the first brake shoe toward the second brake shoe.

Here, the second gear may be a worm gear, and the transmission shaft may be formed to protrude from a front surface of the third gear and include a worm engaged with the second gear formed at a front end thereof.

Here, the rotating member may be a ball nut coupled to the rotating screw.

Here, the electro-mechanical brake may further include a guide portion that is between the second gear and the rotating member, limits the second gear to rotate about the second rotating shaft together with the rotating member, and guides the second gear to relatively translate with the rotating member along an axial direction in which the second rotating shaft is extended.

Here, the guide portion may include a rotating member-guide surface that is formed on one side of an outer peripheral surface of the rotating member; and a second gear-guide surface that is formed on one side of an inner peripheral surface of the second gear to correspond to the rotating member-guide surface.

As an electro-mechanical brake according to another aspect of the present invention, an electro-mechanical brake including a drum, a first brake shoe, and a second brake shoe, may include a motor that provides a rotational driving force; a rotating member that rotates about a second rotating shaft perpendicular to a first rotating shaft of the motor; a power transmission member that includes a first gear coupled to the first rotating shaft of the motor, a second gear formed on an outer peripheral surface of the rotating member, a third gear disposed on a third rotating shaft parallel to the first rotating shaft and engaged with the first gear, and a transmission shaft to transmit a rotational force of the third gear to the second gear, and transmits the rotational driving force of the motor to the rotating member; a rotating screw that is coupled to the rotating member so that the first brake shoe is able to move forward and backward toward one inner peripheral surface of the drum; a rotation preventing member that controls the third gear to rotate in only one direction; and a pressing member that is coupled to the second brake shoe of the rotating screw to press the second brake shoe toward an inner peripheral surface of the drum by an axial force of the rotating screw.

Here, the rotating screw may include a first body portion coupled to the rotating member, and a second body portion formed behind the first body portion and coupled to the pressing member, a guide groove may be formed on one side of the pressing member in the longitudinal direction of the rotating screw, the guide groove may be formed to have a size of a cross section perpendicular to an axis extending in a longitudinal direction smaller than a size of a cross section of the first body portion, the second body portion may be inserted into the guide groove so that an outer peripheral surface of the second body portion is supported by an inner peripheral surface of the guide groove.

Here, the electro-mechanical brake may further include a thrust bearing that is disposed between the first body portion and the pressing member to support a load according to an axial force of the rotating screw.

Here, the electro-mechanical brake may further include a guide housing that includes an inside in which the rotating member and the pressing member are disposed, the rotating member may be formed in a cylindrical shape surrounding the rotating screw, the guide housing may include a first guide surface formed on one side of the inside so as to be in contact with the outer peripheral surface of the rotating member in order to guide rotation of the rotating member and back-and-forth movement in a longitudinal direction of the rotating screw, and a second guide surface formed on the other side of the inside so as to be in contact with an outer peripheral surface of the pressing member to guide back-and-forth movement of the pressing member.

Here, the guide housing may further include a second gear-support surface formed between the first guide surface and the second guide surface to support one side of the second gear, and a stopper that is disposed on one side of the second guide surface and supports the other side of the second gear may be further included.

Here, a stopper groove formed to be recessed in a radial direction may be provided on one side of the second guide surface, the stopper may be formed in a C-shape that is elastically deformed and is seated in the stopper groove.

Here, the electro-mechanical brake may further include a ring-shaped first protection member disposed between the second gear-support surface and one side of the second gear.

Here, the second gear may include a first support portion formed to protrude from the one side of the second gear in the longitudinal direction of the rotating screw, the guide housing may further include a third guide surface formed in a circumferential direction between the first guide surface and the support surface to support an outer surface of the first support portion, the first protection member may be extended in the longitudinal direction of the rotating screw so as to be disposed between the third guide surface and the first support portion.

Here, the electro-mechanical brake may further include a ring-shaped second protection member disposed between the stopper and the other side of the second gear.

Here, the second gear may include a second support portion formed to protrude from the other side of the second gear in the longitudinal direction of the rotating screw, the second protection member may be disposed between the second guide surface and the second support portion.

Here, the second gear may be extended in the longitudinal direction of the rotating screw to support an inner side of the other side of the second gear.

As an electro-mechanical brake according to another aspect of the present invention, an electro-mechanical brake including a drum, a first brake shoe, and a second brake shoe, may include a motor that provides a rotational driving force; a rotating member that rotates about a second rotating shaft perpendicular to a first rotating shaft of the motor; a power transmission member that includes a first gear coupled to the first rotating shaft of the motor, a second gear formed on an outer peripheral surface of the rotating member, a third gear disposed on a third rotating shaft parallel to the first rotating shaft and engaged with the first gear, and a transmission shaft to transmit a rotational force of the third gear to the second gear, and transmits the rotational driving force of the motor to the rotating member; a rotating screw that is coupled to the rotating member so that the first brake shoe is able to move forward and backward toward one inner peripheral surface of the drum; and a rotation preventing member that controls the third gear to rotate in only one direction.

Here, the rotation preventing member may include a latch that is able to be inserted into a latching space formed on one side of the third gear, the third gear may be in a locked state in which the third gear is rotated only in one direction when the latch is inserted into the latching space, and the third gear may be in an unlocked state in which the third gear is rotated in both directions when the latch is separated from the latching space, Here, the latch may be pivotable rotated, the rotation preventing member may further include a plurality of protrusions continuously formed along a circumference of the third gear on one side of the third gear, and an actuator for controlling the pivot rotation of the latch, and the locking space may be formed in a plurality between the plurality of protrusions.

A vehicle including an electro-mechanical brake according to another aspect of the present invention may include the above described electro-mechanical brake; a wheel to which a drum is coupled to one side; a first brake shoe that is disposed on one inner peripheral surface of the drum and coupled to the electro-mechanical brake; a second brake shoe that is disposed on the other inner peripheral surface of the drum and coupled to the electro-mechanical brake. In a driving state, a rotation speed of the wheel may be controlled by pressing the first brake shoe and the second brake shoe while the unlocked state is maintained, and in a parking state, the locked state may be maintained while the first brake shoe and the second brake shoe are pressed.

DETAILED DESCRIPTION OF THE INVENTION

Figure 1:
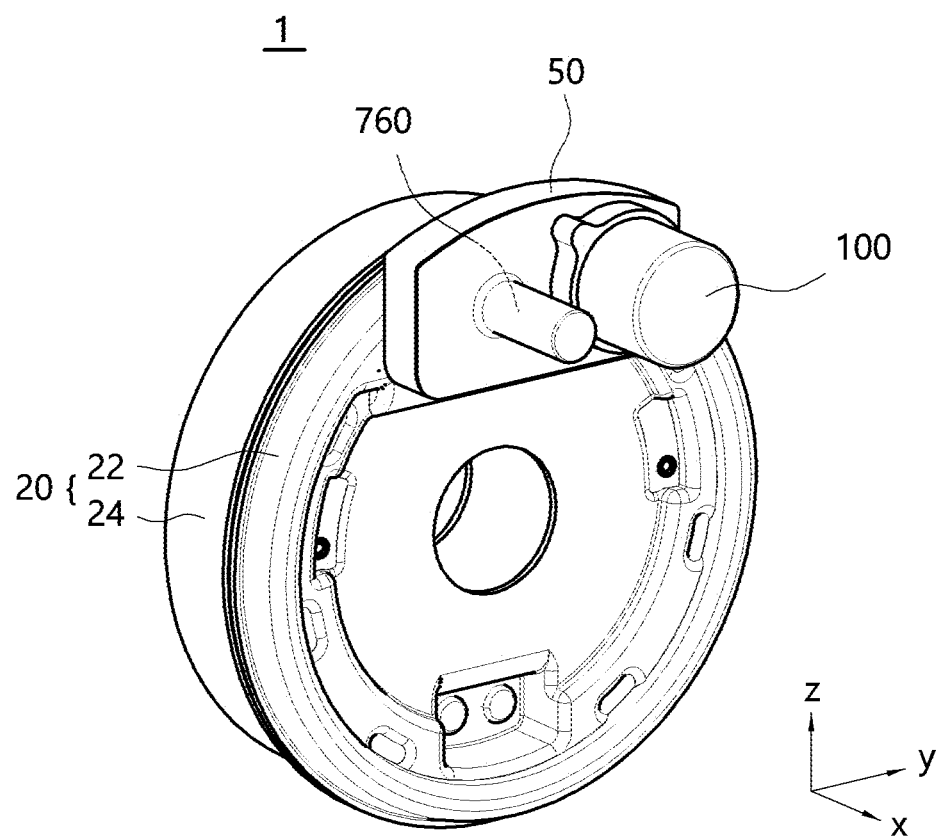
FIG. 1 is a perspective view of an electro-mechanical brake according to an embodiment of the present invention.

Hereinafter, with reference to the accompanying drawings, embodiments of the present invention will be described in detail so that those of ordinary skill in the art to which the present invention pertains can easily implement them. The present invention may be embodied in many different forms and is not limited to the embodiments described herein. Unless otherwise defined, terms used in the embodiments of the present invention may be interpreted as meanings commonly known to those of ordinary skill in the art.

In order to clearly explain the present invention in the drawings, parts irrelevant to the description are omitted, and the same reference numerals are assigned to the same or similar components throughout the specification. Hereinafter, in FIG. 1, the X axis is defined as a rear direction, the Y axis is defined as a left direction, and the Z axis is defined as an upper direction for description.

The present invention relates to an electro-mechanical brake, and the present invention provides an electro-mechanical brake for controlling the rotational force of a drum by using the frictional force between a brake shoe and the drum by pressing the brake shoe using the rotational driving force of a motor.

In particular, an electro-mechanical brake according to an embodiment of the present invention may be installed on wheels of a vehicle to electronically control the braking of a drum rotating together with the wheels of the vehicle. Accordingly, the present invention provides an electro-mechanical brake capable of performing the functions of a parking brake and a service brake in one device using the driving force of the motor without using a conventional hydraulic method.

Figure 2:
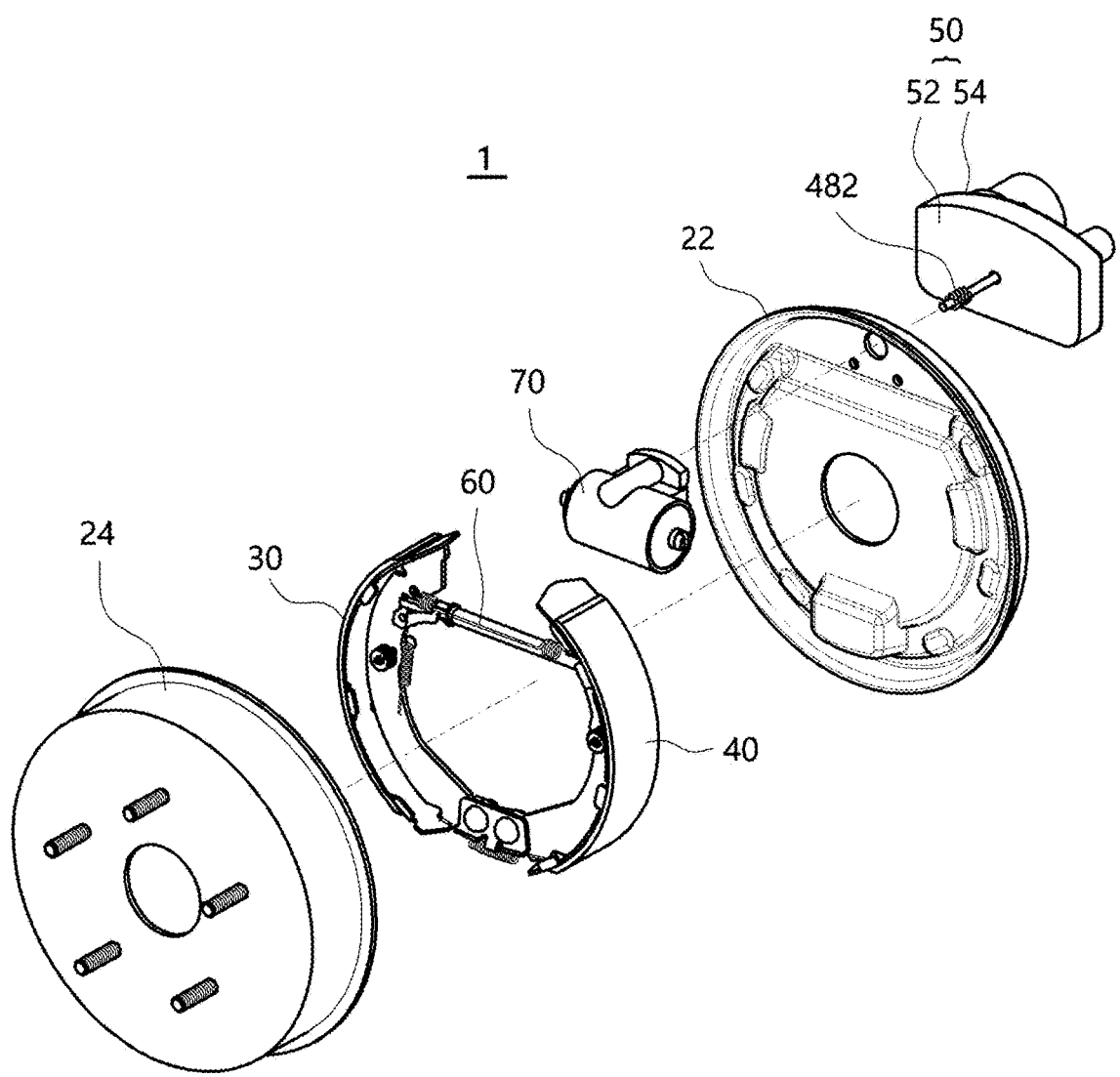
FIG. 2 is an exploded perspective view of an electro-mechanical brake according to an embodiment of the present invention.
Figure 3:
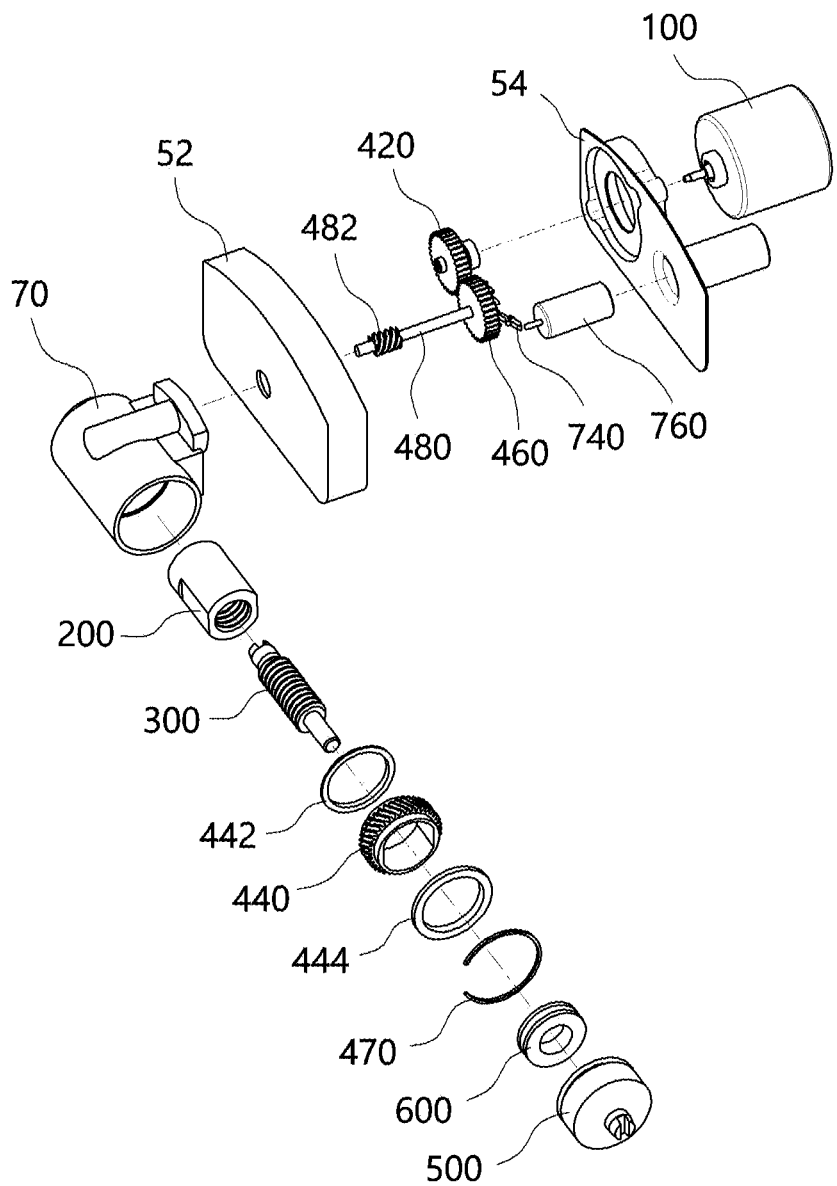
FIG. 3 is an exploded perspective view of a power transmission member of an electro-mechanical brake according to an embodiment of the present invention.
Figure 4:
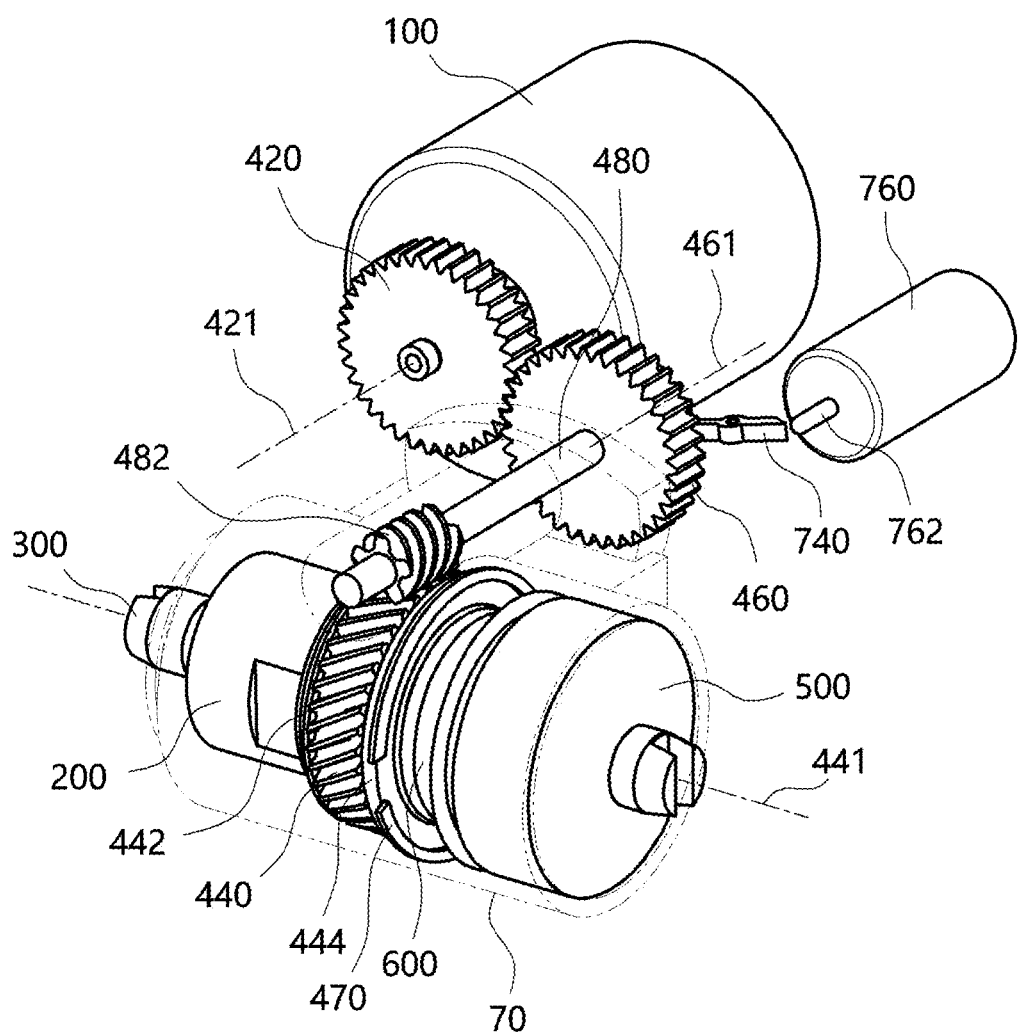
FIG. 4 is an enlarged view of a power transmission member of an electro-mechanical brake according to an embodiment of the present invention.
Figure 5:
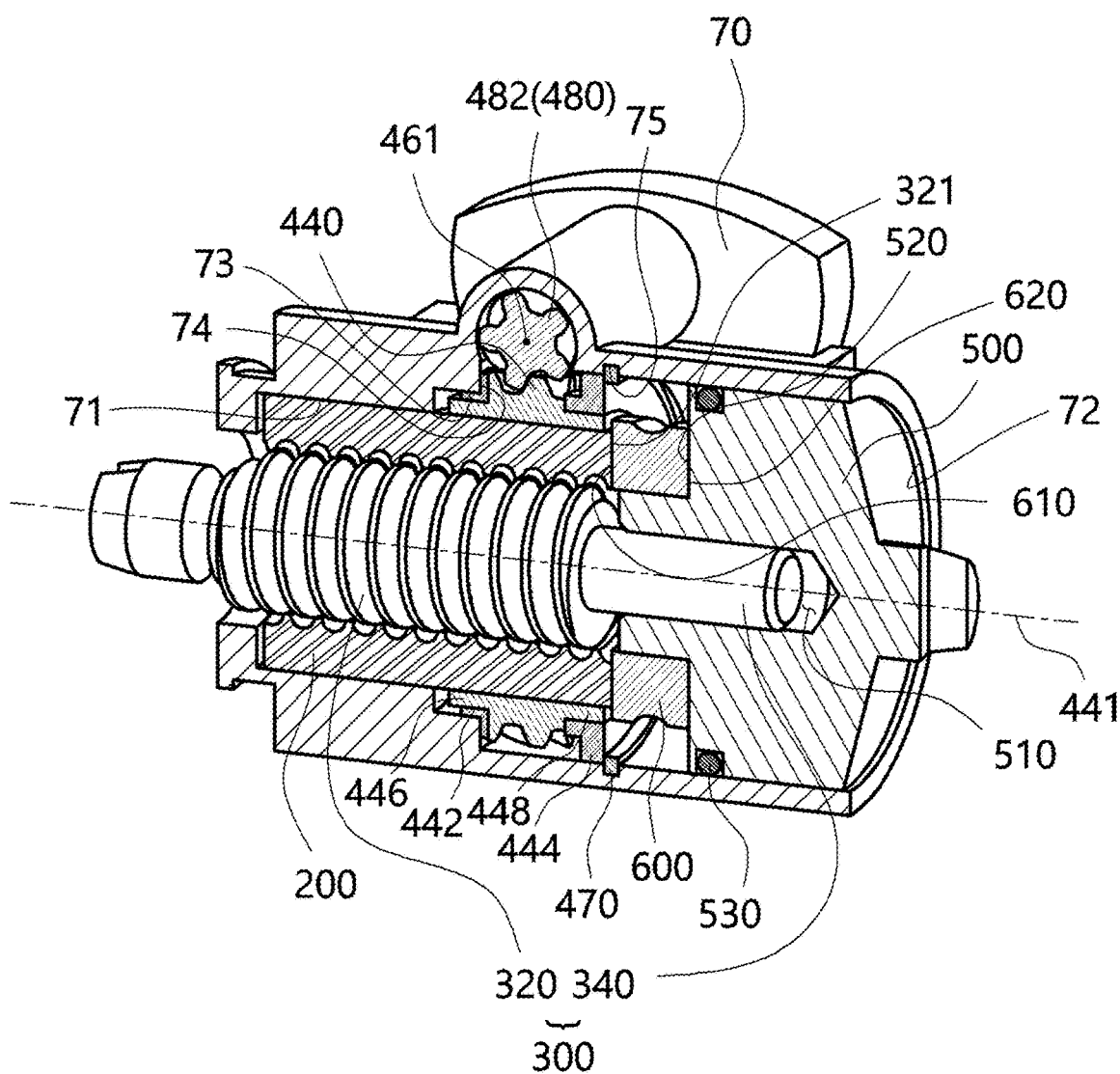
FIG. 5 is a cross-sectional view showing a state in which a rotating member, a rotating screw, and a pressing member of an electro-mechanical brake according to an embodiment of the present invention are combined.
Figure 6:
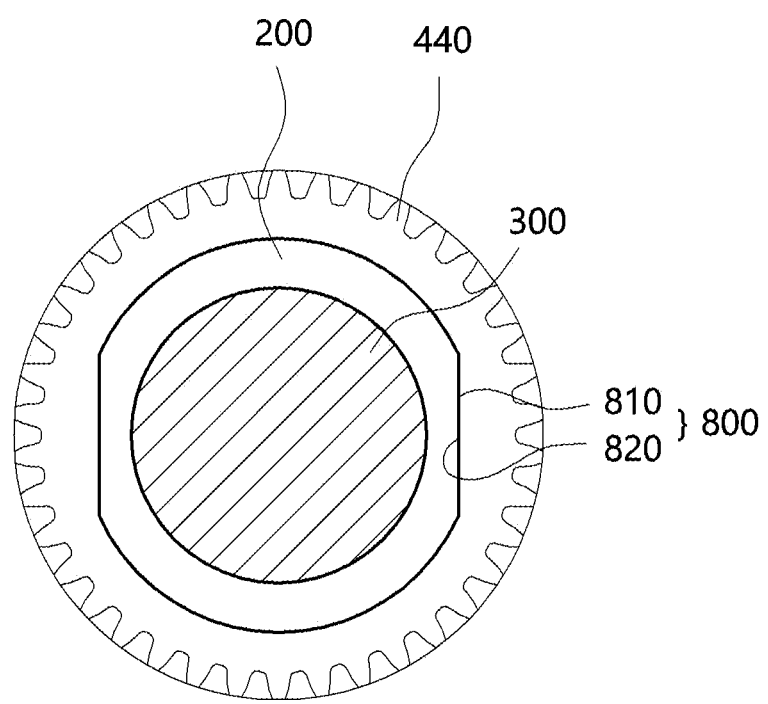
FIG. 6 is a view showing a cross section perpendicular to a longitudinal direction to show a coupling relationship between a rotating member and a second gear of an electro-mechanical brake according to an embodiment of the present invention.

FIG. 1 is a perspective view of an electro-mechanical brake according to an embodiment of the present invention. FIG. 2 is an exploded perspective view of an electro-mechanical brake according to an embodiment of the present invention. FIG. 3 is an exploded perspective view of a power transmission member of an electro-mechanical brake according to an embodiment of the present invention. FIG. 4 is an enlarged view of a power transmission member of an electro-mechanical brake according to an embodiment of the present invention. FIG. 5 is a cross-sectional view showing a state in which a rotating member, a rotating screw, and a pressing member of an electro-mechanical brake according to an embodiment of the present invention are combined. FIG. 6 is a view showing a cross section perpendicular to a longitudinal direction to show a coupling relationship between a rotating member and a second gear of an electro-mechanical brake according to an embodiment of the present invention.

An electro-mechanical brake 1 according to an embodiment of the present invention includes a first brake shoe 30, a second brake shoe 40, a housing 50, a guide housing 70, a motor 100, a power transmission member 400, a rotating member 200, a rotating screw 300 and a pressing member 500.

As shown in FIGS. 1 to 2, the first brake shoe 30 and the second brake shoe 40 are disposed inside the drum 20 rotating together with the wheels of a vehicle. The first brake shoe 30 and the second brake shoe 40 are disposed to face each other and are disposed to face the left inner peripheral surface and right inner peripheral surface of the drum 20, respectively.

Here, the housing 50 is formed on the upper rear side of the drum 20. As shown in FIG. 2, a motor that provides a driving force to allow the first brake shoe 30 and the second brake shoe 40 to press the inner peripheral surface of the drum 20 is placed in the housing 50.

The motor 100 is electronically operated to provide a rotational driving force in one direction or the other direction, and in the present embodiment, it may be a brushless AC motor having a relatively high output. However, the type of the motor 100 is not limited.

The motor 100 is connected to a controller (not shown) built into the vehicle to control its operation. For example, when a driver operates a brake pedal (not shown), the controller (not shown) measures the separation degree of the brake pedal (not shown). The controller (not shown) controls the motor 100 based on the measured information to control the degree to which the first brake shoe 30 and the second brake shoe 40 press the inner peripheral surface of the drum 20.

Here, in order to transmit the rotational driving force of the motor 100 to the first brake shoe 30 and the second brake shoe 40, the input of the rotational driving force of the power transmission member 400 is connected to the motor 100, and the output of the rotation driving force of the transmission member 400 is connected to the rotating member 200 to be described later.

Here, the power transmission member 400 of the electro-mechanical brake 1 according to an embodiment of the present invention includes a first gear 420, a second gear 440, a third gear 460, a transmission shaft 480. and a guide portion 800.

As shown in FIGS. 3 and 4, the first gear 420 is coupled to the first rotating shaft 421 of the motor 100. The third gear 460 is engaged with the first gear 420. Here, a third rotating shaft 461, which is the rotating shaft of the third gear 460, is disposed parallel to a first rotating shaft 421.

To this end, the first gear 420 and the third gear 460 are rotatably supported in the housing 50.

The first gear 420 transmits the rotational driving force of the motor 100 to the third gear 460. Here, as long as the first gear 420 and the third gear 460 can transmit the rotational driving force, the type of gear is not limited. For example, as in the present embodiment shown in FIG. 4, the first gear 420 and the third gear 460 may be spur gears.

The transmission shaft 480 extending forwardly is formed on the rotating shaft of the third gear 460. The transmission shaft 480 may be integrally formed with the third gear 460, and in this case, the process of assembling the power transmission member 400 may be simplified.

An end of the transmission shaft 480 is engaged with the second gear 440 as shown in FIG. 4. Here, a second rotating shaft 441, which is the rotating shaft of the second gear 440, and the third rotating shaft 461 of the transmission shaft 480 are vertically arranged. Here, the front side of the transmission shaft 480 is rotatably supported inside the guide housing 70 to be described later.

To this end, as shown in FIG. 4, a worm is formed at the end of the transmission shaft 480, and the second gear 440 may be formed as a worm gear engaged with the worm formed on the transmission shaft 480.

As such, when the rotational driving force of the high-speed motor 100 is transmitted to the second gear 440 through the coupling of the worm and the worm gear, it has the advantage of being able to reduce the noise generated while the second gear 440 and the transmission shaft 480 operate.

However, if the rotational driving force of the motor 100 can be transmitted to the second gear 440 in a state in which the second rotating shaft 441 and the third rotating shaft 461 are vertically disposed, the type of gear is not limited.

Meanwhile, as shown in FIGS. 3 and 4, the rotating member 200 is coupled to the second gear 440 and rotates together with the second gear 440. The rotating member 200 is formed in a cylindrical shape through which a central portion in a longitudinal direction is penetrated as shown in FIG. 3. The rotating member 200 is disposed inside the guide housing 70 to be described later.

Here, the rotating member 200 may relatively translate with the second gear 440 along an axis extending from the second rotating shaft 441, while rotating about the second rotating shaft 441 by the rotational driving force transmitted to the second gear 440.

To this end, a guide portion 800 is formed between the rotating member 200 and the second gear 440. As shown in FIG. 6, the guide portion 800 of the electro-mechanical brake 1 according to the present embodiment includes a pair of rotating member-guide surfaces 810 formed on both sides of the outer peripheral surface of the rotating member 200 and a pair of second gear-guide surfaces 820 formed on the inner peripheral surface of the second gear 440 to correspond to the pair of rotating member-guide surfaces 810. Accordingly, as shown in FIG. 6, the pair of rotating member-guide surfaces 810 and the pair of second gear-guide surfaces 820 come into contact in the state in which the second gear 440 and the rotating member 200 are coupled, so that the rotating member 200 can rotate according to the second gear 440.

In addition, the rotating member 200 can move relative to the second gear 440 by the length in which the rotating member-guide surfaces 810 and the second gear-guide surfaces 820 extend in the longitudinal direction of the rotating member 200.

However, the guide portion 800 is not limited to the shape described in this embodiment, and as long as the guide portion 800 can limit the relative rotational movement of the rotating member 200 and the second gear 440 and guide the relative translational movement of the rotating member 200 and the second gear 440, there is no limit to the shape or number of the guide portion to be formed.

On the other hand, as shown in FIG. 5, the rotating screw 300 is formed to extend in length to be longer than the rotating member 200, and includes a first body portion 320 and a second body portion 340 disposed in the longitudinal direction.

The rotating member 200 is coupled to the first body portion 320, and the pressing member 500 to be described later is coupled to the second body portion 340.

Here, the rotating member 200 and the rotating screw 300 may be combined in the form of ball screw nut as a ball nut and a ball screw, respectively.

In a brake system that provides a braking force by pressing a disc, dust is likely to be generated due to friction between the brake pad and the disc. In addition, since the brake is generally disposed on the wheels of a vehicle and disposed adjacent to a road surface, dust or foreign substance tends to rise when the wheels move on the road surface. Here, as in the electro-mechanical brake 1 according to an embodiment of the present invention, the rotating screw 300 and the rotating member 200 are combined in the form of ball screw nut, so that even if dust enters between the rotating screw 300 and the rotating member 200, the rotating screw 300 and the rotating member 200 are less damaged, thereby increasing durability.

In addition, since the rotating screw 300 and the rotating member 200 are combined in the form of ball screw nut, the electro-mechanical brake 1 according to an embodiment of the present invention generally has less backlash of the rotating screw 300 compared to a general screw coupling, so that the brake can be controlled more precisely.

On the other hand, when the rotating member 200 rotates according to the second gear 440, the rotating screw 300 moves forward or backward along the axis extending the second rotating shaft 441 according to the rotation direction of the rotating member 200.

Here, one end of the rotating screw 300 is coupled to the first brake shoe 30. The first brake shoe 30 presses the inner peripheral surface of the drum 20 as the rotating screw 300 moves forward.

On the other hand, referring to FIG. 5, the pressing member 500 is coupled to the second body portion 340 of the rotating screw 300. The pressing member 500 is coupled to the second brake shoe 40 and presses the second brake shoe 40 toward the inner peripheral surface of the drum 20 by the axial force generated while the rotating screw 300 moves forward and presses the first brake shoe 30.

Here, a guide groove 510 is formed in the pressing member 500 in the longitudinal direction of the rotating screw 300. The second body portion 340 formed to protrude from one side of the rotating screw 300 is inserted into the guide groove 510.

the second body portion 340 is separated from the guide groove 510 when the rotating screw 300 moves forward toward the first brake shoe 30, and is inserted into the guide groove 510 when the rotating screw 300 moves backward toward the second brake shoe 40.

Here, as shown in FIG. 5, the cross-section area is formed to be small in the order of the first body portion 320 and the second body portion 340, and the guide groove 510 is formed to have the cross-sectional area corresponding to the cross-sectional area of the second body portion 340.

Accordingly, in the pressing member 500, a left end surface 520 on which the guide groove 510 is formed may be supported on a right end surface 321 of the first body portion 320. Accordingly, the pressing member 500 cannot move toward the first body portion 320 and may stay at the right end of the rotating screw 300.

Here, as shown in FIG. 5, a thrust bearing is disposed between the rotating member 200 and pressing member 500 coupled to the outer peripheral surface of the rotating screw 300.

Even when a load according to the axial force of the rotating screw 300 is transmitted to the rotating member 200, one surface 610 of the thrust bearing 600 supports the right end surface 321 of the rotating member 200 and the other surface 620 of the thrust bearing 600 supports the left end surface 520 of the pressing member 500, thereby preventing the rotating member 200 from being damaged. In particular, it is possible to prevent damage due to friction between the right end surface 321 of the rotating member 200 and the left end surface 520 of the pressing member 500 through the thrust bearing 600.

Meanwhile, the rotating member 200, the rotating screw 300 and the pressing member 500 are disposed inside the guide housing 70 coupled to the front of the housing 50. The guide housing 70 is disposed inside the drum 20 and serves to protect the configuration disposed in the inner space from foreign substances.

In addition, it serves to guide the movements of the rotating member 200 and pressing member 500 of the guide housing 70. To this end, a first guide surface 71, a second guide surface 72, a third guide surface 73, and a support surface 74 are formed in the inner space of the guide housing 70.

As shown in FIG. 3, the guide housing 70 has a space therein and is formed to extend toward the first brake shoe 30 and the second brake shoe 40. Accordingly, as shown in FIG. 5, in the inner space of the guide housing 70, the rotating member 200 on one side and the pressing member 500 on the other side are disposed in the extending direction of the second rotating shaft 441.

The first guide surface 71 is formed to be in contact with the outer peripheral surface of the rotating member 200. Here, the first guide surface 71 is formed to correspond to the shape of the outer peripheral surface of the rotating member 200 in order to guide the rotation and translational motions in one direction of the rotating member 200. That is, as shown in FIG. 5, the first guide surface 71 is formed in a cylindrical shape.

The second guide surface 72 is disposed in contact with the outer peripheral surface of the pressing member 500. Here, since the pressing member 500 only performs translational motion in one direction unlike the rotating member 200, the second guide surface 72 is formed in a cylindrical shape to correspond to the outer peripheral surface of the pressing member 500 to guide this motion.

Here, as shown in FIG. 5, in order to block foreign substances from entering between the outer peripheral surface of the pressing member 500 and the second guide surface 72, an O-ring 530 may be coupled on one side of the outer peripheral surface of the pressing member 500 in a circumferential direction.

As shown in FIG. 5, there is a space recessed outwardly from the first guide surface 71 between the first guide surface 71 and the second guide surface 72 so that the second gear 440 may be disposed. Here, the second gear-support surface 74 is formed on one side of the recessed space to support one side of the second gear 440. The second gear-support surface 74 prevents the second gear 440 from moving toward the first brake shoe 30 so that the second gear 440 maintains an engaged state with the worm 482 of the transmission shaft 480.

Conversely, in order to prevent the second gear 440 from moving toward the second brake shoe 40, as shown in FIG. 5, the second guide surface 72 is provided with a stopper 470 that supports the other side of the second gear 440. Here, a stopper groove 75 formed to be recessed in a radial direction is provided on one side of the second guide surface 72, and the stopper 470 is seated and fixed in the stopper groove 75.

Here, the stopper 470 is formed in a C-shape as shown in FIG. 3. Accordingly, the stopper 470 can be elastically deformed toward the open side. Accordingly, after disposing the second gear 440 and the rotating member 200 inside the guide housing 70, the stopper 470 may be installed on the second guide surface 72 to fix the second gear 440.

As shown in FIG. 3, the electro-mechanical brake 1 according to an embodiment of the present invention may further include a first protection member 442 and a second protection member 444. The first protection member 442 is disposed on one side of the second gear 440, and the second protection member 444 is disposed on the other side of the second gear 440.

The first protection member 442 protects the gear teeth of the second gear 440. Here, as shown in FIG. 5, by disposing the first protection member 442 between the second gear-support surface 74 of the guide housing 70 and one side of the second gear 440, it is possible to prevent the second gear 440 from being damaged due to friction while in direct contact with the second gear-support surface 74 during rotation.

Similarly, the second protection member 444 is disposed between the other side of the second gear 440 and the stopper 470 to prevent damage to the second gear 440. Here, the side of the second protection member 444 on which the second gear is placed may be protruded to support the second rotating shaft 441 placed on the other side of the second gear 440, that is, the inner side. Accordingly, it is possible to further prevent damage to the second gear 440 by preventing the outermost gear teeth portion of the second gear 440 from being in direct contact with the second protection member 444.

Meanwhile, as shown in FIG. 5, a first support portion 446 protruding in the direction of the second rotating shaft 441 is formed on one side of the second gear 440, and a second support portion 448 protruding in the direction of the second rotating shaft 441 is formed on the other side of the second gear 440. The first support portion 446 and the second support portion 448 increase the area in which the second gear 440 is coupled to the rotating member 200 so that the rotating member 200 and the second gear 440 can be firmly coupled.

In the inside of the guide housing 70, a third guide surface 73 formed by being recessed in a radial direction rather than the first guide surface 71 is formed between the second gear-support surface 74 and the first guide surface 71 as a position corresponding to the first support portion 446. Accordingly, a step is formed between the first guide surface 71 and the third guide surface 73.

Here, the first protection member 442 may be disposed between the first support portion 446 and the third guide surface 73 to support the first support portion 446 toward the rotating member 200. To this end, in a state disposed between the second gear-support surface 74 and one side surface of the second gear 440, the first protection member 442 is formed with an inner side protruding toward the first brake shoe 30, so that the support portion 446 can also be supported together.

Meanwhile, referring to FIG. 2, the electro-mechanical brake 1 according to an embodiment of the present invention may further include an elastic member 60.

The elastic member 60 for pulling the first brake shoe 30 and the second brake shoe 40 is disposed between the first brake shoe 30 and the second brake shoe 40.

The elastic member 60 provides a force to pull the first brake shoe 30 and the second brake shoe 40 inward, so that the first brake shoe 30 and the second brake shoe 40 are spaced apart from the inner peripheral surface of the drum 20 so as not to press the drum 20 when the vehicle is in a driving state.

In addition, since the elastic member 60 has an effect of pulling the rotating screw 300 and the pressing member 500 connected to the first brake shoe 30 and the second brake shoe 40, respectively, inward, it is possible to prevent the rotating member 200 and pressing member 500 coupled to the rotating screw 300 from being spaced apart.

Figure 7:
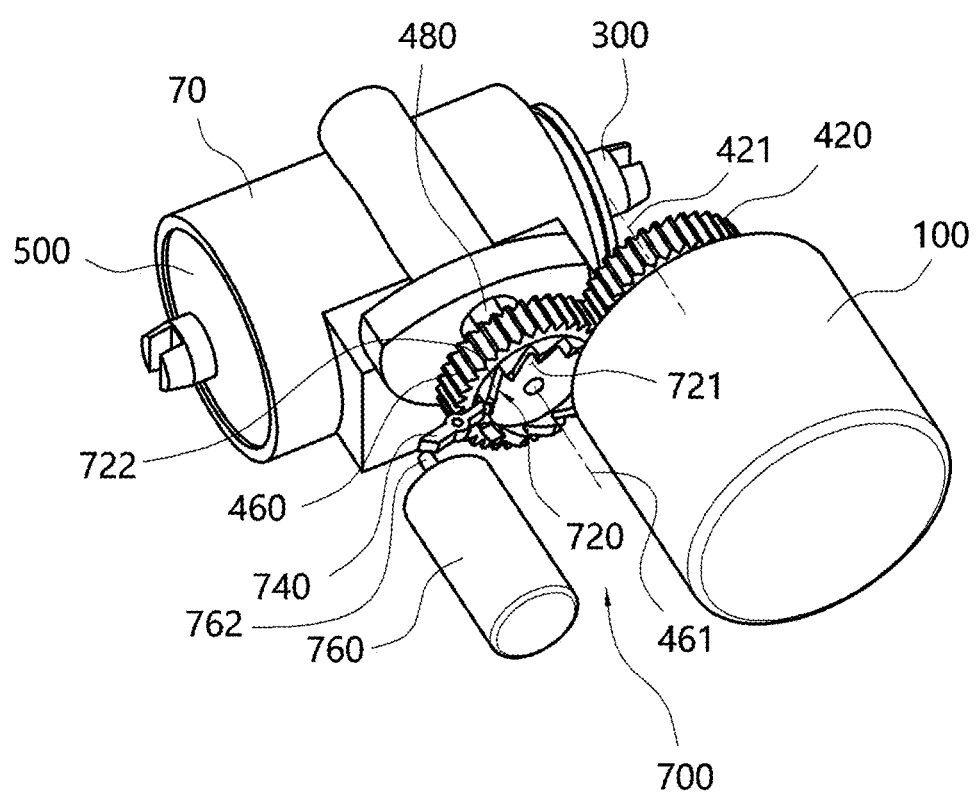
FIG. 7 is an enlarged view of a rotation preventing member of an electro-mechanical brake according to an embodiment of the present invention.

FIG. 7 is an enlarged view of a rotation preventing member of an electro-mechanical brake according to an embodiment of the present invention.

The electro-mechanical brake 1 according to an embodiment of the present invention may further include a rotation preventing member 700. Here, the rotation preventing member 700 includes a latch 740, a plurality of protrusions 720, and an actuator 760. The rotation preventing member 700 serves to control the third gear 460 to rotate in only one direction.

To this end, a latching space 721 is formed in the third gear 460, and a position at which the latching space 721 is formed may be formed on the front or rear surface of the third gear 460. However, in this embodiment, as shown in FIG. 7, the latching space 721 is formed on the rear surface of the third gear 460.

Here, the latch 740 may be inserted into the latching space 721. When the latch 740 is inserted into the latching space 721, it is in a locked state in which the third gear 460 can be rotated in only one direction. In addition, when the latch 740 is separated from the latching space 721, it is in an unlocked state in which the third gear 460 can be rotated in both directions.

To this end, the latching space 721 is disposed along the circumference of the front surface of the third gear 460 with the third rotating shaft 461 as the center. There is no limitation on the shape in which the latching space 721 is formed.

For example, although not shown in the drawings, the latching space 721 is formed with a plurality of grooves on the rear surface of the third gear 460, or in this embodiment, as shown in FIG. 7, the latching space 721 may be formed between the plurality of protrusions 720 protruding from the rear surface of the third gear 460.

Here, as shown in FIG. 7, one side of the latching space may be inclined and the other side of the latching space 721 may be formed vertically, along the circumferential direction. That is, as shown in FIG. 7, when the protrusion 720 is formed to protrude from the rear of the third gear 460, an inclined surface 722 may be formed only one of both sides of the protrusion 720 disposed in the circumferential direction of the third gear 460.

Accordingly, when the third gear 460 rotates in one direction, the latch 740 can move along the inclined surface 722 while in contact with the inclined surface 722 of the protrusion 720.

On the other hand, when the third gear 460 rotates in the other direction, the latch 740 comes into contact with the opposite side of the inclined surface 722 and cannot move. Here, the wheels of the vehicle are no longer able to move in the opposite direction to one direction.

Meanwhile, the latch 740 may pivotally rotate within the housing 50. Accordingly, one side of the latch 740 may be repeatedly inserted into or separated from the latching space 721.

Here, referring to FIG. 3, the actuator 760 is disposed inside the housing 50 to rotate the latch 740. The actuator 760 controls the rotation of the latch 740.

Here, the actuator 760 may push or pull one side of the latch 740 to rotate the latch 740. To this end, the actuator 760 may be a solenoid switch in which a permanent magnet 762 is disposed in the central portion of a coil wound a plurality of times, and the permanent magnet 762 can reciprocate by electromagnetic force of the coil.

Accordingly, as shown in FIG. 7, in the front side of the actuator 760, the front end of the permanent magnet 762 may protrude toward one side of the latch 740. Here, the side of the latch 740 toward which the permanent magnet is directed is a metal to which magnetic force can be applied, and the latch 740 may move according to the movement of the permanent magnet.

However, the method of rotating the latch 740 is not limited thereto. For example, although not shown in the drawings, the latch 740 is hinge-coupled to the front end of the permanent magnet 762 so that the latch 740 can be rotated according to the movement of the permanent magnet 762.

As described above, since the latch 740 should be inserted into the latching space 721 formed in the third gear 460, the actuator 760 is disposed adjacent to the motor 100. Accordingly, the space efficiency inside the housing 50 may be improved, and the size of the electro-mechanical brake 1 may be reduced.

In addition, since the rotation preventing member 700 is installed on the gear adjacent to the motor 100, even when the supporting force of the protrusion 720 and the rotational driving force of the motor 100 act together, it is possible to prevent distortion of the power transmission member 400 in a locked state in which the latch 740 supports the protrusion 720.

Figure 8:
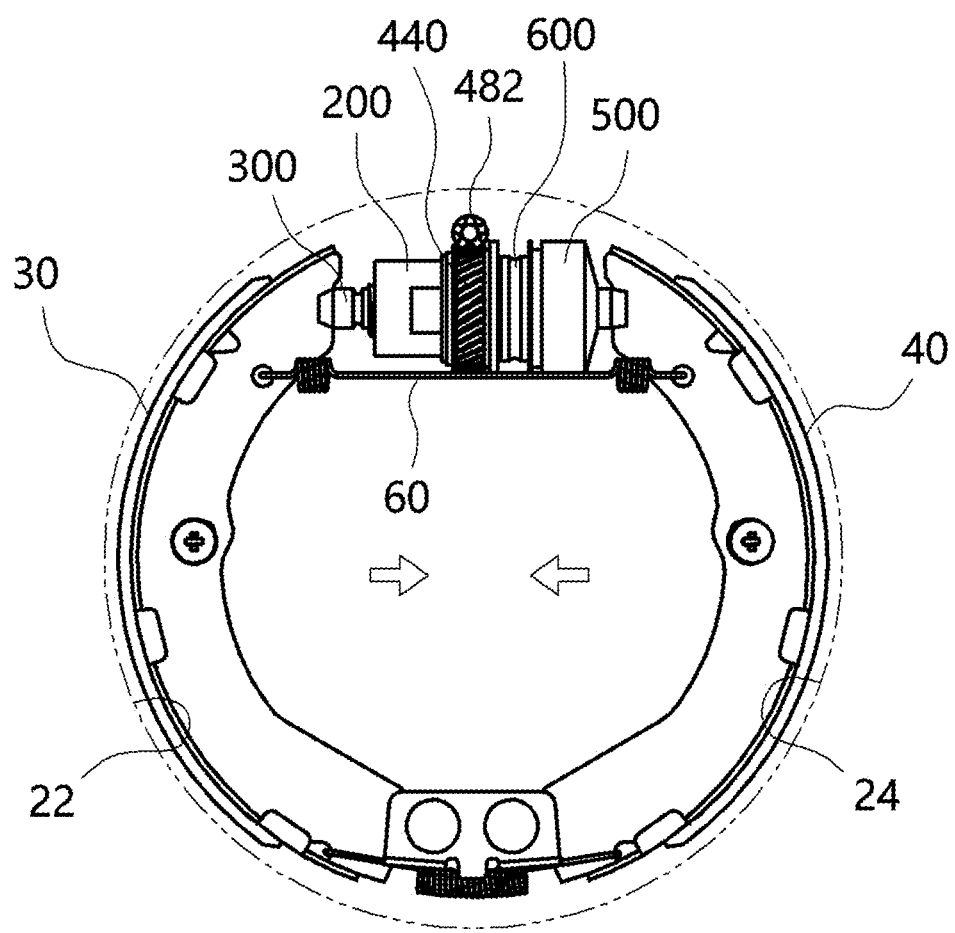
FIG. 8 is a view showing a driving state of an electro-mechanical brake according to an embodiment of the present invention.
Figure 9:
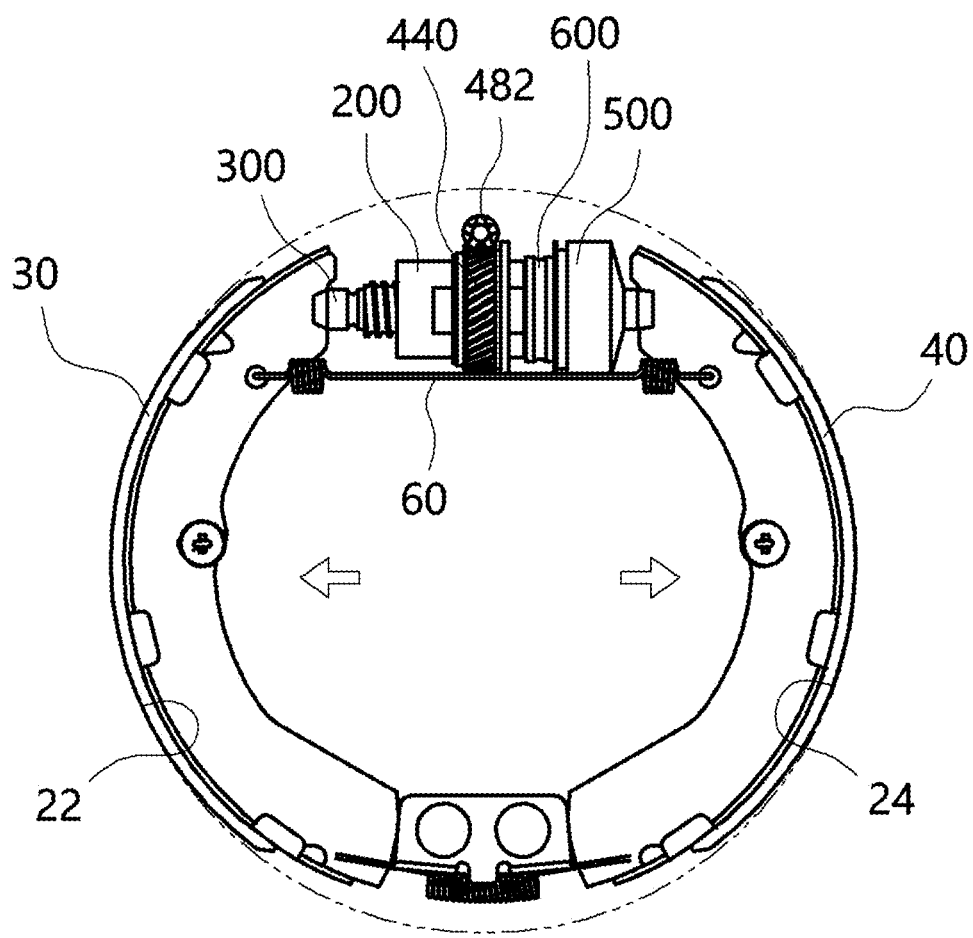
FIG. 9 is a view showing a braking state of an electro-mechanical brake according to an embodiment of the present invention.

Hereinafter, the operation of an electro-mechanical brake according to an embodiment of the present invention will be described with reference to FIGS. 8 and 9. Here, FIG. 8 is a view showing a driving state of an electro-mechanical brake according to an embodiment of the present invention. FIG. 9 is a view showing a braking state of an electro-mechanical brake according to an embodiment of the present invention.

As shown in FIG. 8, in the driving state of the vehicle, the rotating screw 300 is moved to the rightmost side in the rotating member 200 by the motor 100.

Here, the elastic member 60 presses the first brake shoe 30 and the second brake shoe 40 to the inside so that the first brake shoe 30 and the second brake shoe 40 are maintained to be spaced apart from the inner peripheral surface of the drum 20.

On the other hand, when a driver switches the vehicle to a braking state through a pedal, the second gear 440 is rotated by the motor 100 and the rotating screw 300 is moved in the direction of the first brake shoe 30.

Here, when the rotating screw 300 presses the first brake shoe 30 and the first brake shoe 30 reaches the inner peripheral surface of the drum 20, an axial force is generated in the direction opposite to the direction in which the rotating screw 300 moves forward, that is, toward the second brake shoe 40.

This axial force is transmitted to the rotating member 200 coupled to the rotating screw 300. Accordingly, the rotating member 200 rotates together with the second gear 440 in a state in which the second gear 440 is fixed so as not to move in the direction of the second rotating shaft 441, but moves toward the second brake shoe 40 relative to the second gear 440. That is, the rotating member 200 moves toward the second brake shoe 40 while rotating about the second rotating shaft 441 as a central axis. (See FIG. 5)

Here, the rotating member 200 sequentially presses the thrust bearing 600 and the pressing member 500, so that the second brake shoe 40 presses the inner peripheral surface of the drum 20.

Accordingly, since the first brake shoe 30 and the second brake shoe 40 press both inner peripheral surfaces of the drum 20, it is possible to apply a braking force to the rotation of the drum 20.

As described above, the electro-mechanical brake according to an embodiment of the present invention can brake the vehicle by controlling the brake shoe using a motor. In particular, it has been described in detail that the present invention has advantages in that the durability of the brake system can be increased by including the ball nut, and the braking state of the wheels can be maintained even when the vehicle is turned off by including the rotation preventing member.

In the above, the electro-mechanical brake according to an embodiment of the present invention has been described, but it will be apparent to those of ordinary skill in the art to which the present invention pertains that the electro-mechanical brake according to this embodiment is not applicable only to the brake system of a vehicle, and may be used as a device for braking a rotating object.

The electro-mechanical brake according to an embodiment of the present invention can minimize and simplify the power transmission structure by arranging the rotating shaft of the motor and the rotating shaft of the rotating screw vertically.

The electro-mechanical brake according to an embodiment of the present invention can reduce damage to the power transmission structure by including the first protection member and the second protection member for protecting the second gear.

The electro-mechanical brake according to an embodiment of the present invention is relatively less damaged by including a ball nut in a brake environment in which dust and foreign substances are easily generated.

The electro-mechanical brake according to an embodiment of the present invention includes less backlash of the screw by including the ball nut.

The electro-mechanical brake according to an embodiment of the present invention can maintain the braking force of the brake in a parking situation by including the rotation preventing member.

It should be understood that the effects of the present invention are not limited to the above-described effects, and include all effects that can be inferred from the configuration of the invention described in the description or claims of the present invention.

As described above, preferred embodiments according to the present invention have been reviewed, and the fact that the present invention can be embodied in other specific forms without departing from the spirit or scope of the present invention in addition to the above-described embodiments will be apparent to one of ordinary skill in the art. Therefore, the above-described embodiments are to be regarded as illustrative rather than restrictive, and accordingly, the present invention is not limited to the above description, but may be modified within the scope of the appended claims and their equivalents.

DESCRIPTION OF REFERENCE NUMERALS

| | | | |
|---|---|---|---|
| 1 | electro-mechanical brake | 440 | second gear |
| 20 | drum | 441 | second rotating shaft |
| 22 | first inner peripheral surface | | |
| 442 | first protection member | | |
| 24 | second inner peripheral surface | | |
| 444 | second protection member | | |
| 30 | first brake shoe | 446 | first support portion |
| 40 | second brake shoe | 448 | second support portion |
| 50 | housing | 460 | third gear |
| 52 | front housing | 461 | third rotating shaft |
| 54 | rear housing | 470 | stopper |
| 60 | elastic member | 480 | transmission shaft |
| 70 | guide housing | 482 | worm |
| 71 | first guide surface | 500 | pressing member |
| 72 | second guide surface | 510 | guide groove |
| 73 | third guide surface | 530 | O-ring |
| 74 | second gear-support surface | 600 | bearing |
| 75 | stopper groove | | |
| 700 | rotation preventing member | | |
| 100 | motor | 720 | protrusion |
| 200 | rotating member | 721 | latching space |
| 300 | rotating screw | 722 | inclined surface |
| 320 | first body portion | 740 | latch |
| 340 | second body portion | 760 | actuator |
| 400 | power transmission member | 762 | permanent magnet |
| 420 | first gear | 800 | guide portion |
| 421 | first rotating shaft | | |
| 810 | rotating member-guide surface | | |
| 820 | second gear-guide surface | | |

What is claimed is:

1. An electro-mechanical brake comprising a drum, a first brake shoe, and a second brake shoe, comprising:
   a motor that provides a rotational driving force;
   a rotating member that rotates about a second rotating shaft perpendicular to a first rotating shaft of the motor;
   a power transmission member that transmits the rotational driving force of the motor to the rotating member;
   a rotating screw that is coupled to the rotating member so that the first brake shoe is able to move forward and backward toward one inner peripheral surface of the drum,
   wherein the power transmission member includes:
   a first gear that is coupled to the first rotating shaft of the motor;
   a second gear that is formed on an outer peripheral surface of the rotating member;
   a third gear that is disposed on a third rotating shaft parallel to the first rotating shaft and engaged with the first gear;
   a transmission shaft that transmits a rotational force of the third gear to the second gear; and
   a guide portion that is between the second gear and the rotating member to guide the second gear to relatively translate with the rotating member along an axial direction in which the second rotating shaft extends while limiting the second gear to rotate about the second rotating shaft together with the rotating member.

2. The electro-mechanical brake according to claim 1, further comprising an elastic member including one end connected to the first brake shoe and the other end connected to the second brake shoe to pull the first brake shoe toward the second brake shoe.

3. The electro-mechanical brake according to claim 1, wherein the second gear is a worm gear, and the transmission shaft is formed to protrude from a front surface of the third gear and includes a worm engaged with the second gear formed at a front end thereof.

4. The electro-mechanical brake according to claim 1, wherein the rotating member is a ball nut coupled to the rotating screw.

5. The electro-mechanical brake according to claim 1, wherein the guide portion includes a rotating member-guide surface that is formed on one side of an outer peripheral surface of the rotating member; and a second gear-guide surface that is formed on one side of an inner peripheral surface of the second gear to correspond to the rotating member-guide surface.

6. An electro-mechanical brake comprising a drum, a first brake shoe, and a second brake shoe, comprising:
  a motor that provides a rotational driving force;
  a rotating member that rotates about a second rotating shaft perpendicular to a first rotating shaft of the motor;
  a power transmission member that includes a first gear coupled to the first rotating shaft of the motor, a second gear formed on an outer peripheral surface of the rotating member, a third gear disposed on a third rotating shaft parallel to the first rotating shaft and engaged with the first gear, and a transmission shaft to transmit a rotational force of the third gear to the second gear, and transmits the rotational driving force of the motor to the rotating member;
  a rotating screw that is coupled to the rotating member so that the first brake shoe is able to move forward and backward toward one inner peripheral surface of the drum;
  a pressing member that is coupled to the second brake shoe of the rotating screw to press the second brake shoe toward an inner peripheral surface of the drum by an axial force of the rotating screw;
  a guide housing that includes an inside in which the rotating member and the pressing member are disposed, the guide housing including a first guide surface formed on one side of the inside so as to be in contact with the outer peripheral surface of the rotating member in order to guide rotation of the rotating member and back-and-forth movement in a longitudinal direction of the rotating screw, a second guide surface formed on the other side of the inside so as to be in contact with an outer peripheral surface of the pressing member to guide back-and-forth movement of the pressing member, and a second gear-support surface formed between the first guide surface and the second guide surface to support one side of the second gear; and
  a stopper that is disposed on one side of the second guide surface and supports the other side of the second gear, wherein the rotating member is formed in a cylindrical shape surrounding the rotating screw.

7. The electro-mechanical brake according to claim 6, wherein the rotating screw includes a first body portion coupled to the rotating member, and a second body portion formed behind the first body portion and coupled to the pressing member,
  a guide groove is formed on one side of the pressing member in the longitudinal direction of the rotating screw,
  the guide groove is formed to have a size of a cross section perpendicular to an axis extending in a longitudinal direction smaller than a size of a cross section of the first body portion,
  the second body portion is inserted into the guide groove so that an outer peripheral surface of the second body portion is supported by an inner peripheral surface of the guide groove.

8. The electro-mechanical brake according to claim 7, further comprising a thrust bearing that is disposed between the first body portion and the pressing member to support a load according to an axial force of the rotating screw.

9. The electro-mechanical brake according to claim 6, wherein a stopper groove formed to be recessed in a radial direction is provided on one side of the second guide surface,
  the stopper is formed in a C-shape that is elastically deformed and is seated in the stopper groove.

10. The electro-mechanical brake according to claim 6, further comprising a ring-shaped first protection member disposed between the second gear-support surface and one side of the second gear.

11. The electro-mechanical brake according to claim 10, wherein the second gear includes a first support portion formed to protrude from the one side of the second gear in the longitudinal direction of the rotating screw,
  the guide housing further includes a third guide surface formed in a circumferential direction between the first guide surface and the support surface to support an outer surface of the first support portion,
  the first protection member is extended in the longitudinal direction of the rotating screw so as to be disposed between the third guide surface and the first support portion.

12. The electro-mechanical brake according to claim 6, further comprising a ring-shaped second protection member disposed between the stopper and the other side of the second gear.

13. The electro-mechanical brake according to claim 12, wherein the second gear includes a second support portion formed to protrude from the other side of the second gear in the longitudinal direction of the rotating screw,
  the second protection member is disposed between the second guide surface and the second support portion.

14. The electro-mechanical brake according to claim 12, wherein the second gear is extended in the longitudinal direction of the rotating screw to support an inner side of the other side of the second gear.

15. The electro-mechanical brake according to claim 1, further comprising a rotation preventing member that controls the third gear to rotate in only one direction.

16. The electro-mechanical brake according to claim 15, wherein the rotation preventing member includes a latch that is able to be inserted into a latching space formed on one side of the third gear,
  the third gear is in a locked state in which the third gear is rotated only in one direction when the latch is inserted into the latching space, and the third gear is in an unlocked state in which the third gear is rotated in both directions when the latch is separated from the latching space.

17. The electro-mechanical brake according to claim 16, wherein the latch is pivotable rotated,
- the rotation preventing member further includes a plurality of protrusions continuously formed along a circumference of the third gear on one side of the third gear, and an actuator for controlling the pivot rotation of the latch, and
- the locking space is formed in a plurality between the plurality of protrusions.

18. A vehicle comprising an electro-mechanical brake, comprising:
- the electro-mechanical brake according to claim 16;
- a wheel to which a drum is coupled to one side;
- a first brake shoe that is disposed on one inner peripheral surface of the drum and coupled to the electro-mechanical brake;
- a second brake shoe that is disposed on the other inner peripheral surface of the drum and coupled to the electro-mechanical brake,
- wherein in a driving state, a rotation speed of the wheel is controlled by pressing the first brake shoe and the second brake shoe while the unlocked state is maintained,
- in a parking state, the locked state is maintained while the first brake shoe and the second brake shoe are pressed.

* * * * *